(12) United States Patent
Robbins et al.

(10) Patent No.: US 11,331,594 B2
(45) Date of Patent: May 17, 2022

(54) EXTRACTION SYSTEM INCLUDING A MULTI-PORT EXTRACTION VESSEL AND EXTRACTION BASKET

(71) Applicant: Azoth Solutions, LLC, Denver, CO (US)

(72) Inventors: Christopher Norman Robbins, Littleton, CO (US); Stephen Whitney Madsen, Littleton, CO (US); Toney Sheldon Bray, Seattle, WA (US); Jon Aaron Bray, Seattle, WA (US)

(73) Assignee: Azoth Solutions, LLC, Denver, CO (US)

( * ) Notice: Subject to any disclaimer, the term of this patent is extended or adjusted under 35 U.S.C. 154(b) by 36 days.

(21) Appl. No.: 16/016,320

(22) Filed: Jun. 22, 2018

(65) Prior Publication Data

US 2018/0369716 A1 Dec. 27, 2018

Related U.S. Application Data

(60) Provisional application No. 62/523,379, filed on Jun. 22, 2017.

(51) Int. Cl.
*B01D 11/02* (2006.01)
*C11B 1/10* (2006.01)

(52) U.S. Cl.
CPC ...... *B01D 11/0223* (2013.01); *B01D 11/0207* (2013.01); *B01D 11/028* (2013.01);
(Continued)

(58) Field of Classification Search
CPC .... B01F 9/06; B01D 11/0434; B01D 11/0457
See application file for complete search history.

(56) References Cited

U.S. PATENT DOCUMENTS 3,944,189 A * 3/1976 Singleton ............... B02C 17/02
366/192
4,049,386 A * 9/1977 Gillain ............... B01D 11/0276
422/270
(Continued)

FOREIGN PATENT DOCUMENTS

CH 690835 A5 * 2/2001 ............... C05F 3/06
EP 0288670 11/1988
(Continued)

OTHER PUBLICATIONS

DaPorto, C. et al. Separation of Aroma Compounds From Industrial Hemp Inflorescences by Supercritical CO2 Extraction and On-Line Fractionation. Industrial Crop and Products 58:99-103, 2014. (Year: 2014).

*Primary Examiner* — Ryan B Huang
(74) *Attorney, Agent, or Firm* — Holzer Patel Drennan (57) ABSTRACT

A system for extracting components from sample material includes a multi-port extraction vessel and an extraction basket that is configured to hold the sample material and to be rotated within the multi-port extraction vessel. The extraction vessel may include multiple ingress ports and multiple egress ports to allow a liquid solvent to flow through the extraction vessel during an extraction process. The extraction basket is permeable to allow liquid solvent to flow through the extraction basket and distribute throughout the sample material held within the extraction basket. A rotation mechanism, such as a motor, may rotate the extraction basket within the extraction vessel during the extraction process. The multi-port extraction vessel, in combination with the rotatable extraction basket, promotes even distribution of the liquid solvent throughout the sample material.

7 Claims, 8 Drawing Sheets

(52) U.S. Cl.
CPC ............ *B01D 11/0273* (2013.01); *C11B 1/10* (2013.01); *C11B 1/104* (2013.01); *B01D 11/0203* (2013.01); *B01D 11/0296* (2013.01)

(56) References Cited

U.S. PATENT DOCUMENTS

| | | | |
|---|---|---|---|
| 4,059,922 | A | 11/1977 | DiGiancinto |
| 4,075,785 | A | 2/1978 | Jones |
| 4,218,847 | A | 8/1980 | Leroux |
| 4,704,818 | A | 11/1987 | Cameron |
| 4,869,019 | A | 9/1989 | Ehrlich |
| 4,965,962 | A | 10/1990 | Akagi |
| 5,136,804 | A | 8/1992 | Rothem |
| 6,000,173 | A | 12/1999 | Schow |
| 6,021,602 | A | 2/2000 | Orsi |
| 7,823,328 | B2 | 11/2010 | Walhovd |
| D638,743 | S | 5/2011 | Bouchard |
| 8,181,391 | B1 | 5/2012 | Giacomantonio |
| 8,505,238 | B2 | 8/2013 | Luebbers |
| 9,814,186 | B2 | 11/2017 | Anderson |
| 9,937,218 | B2 | 4/2018 | Towle |
| 10,517,911 | B2 | 12/2019 | Gharib |
| 2008/0172938 | A1 | 7/2008 | Azoulay |
| 2012/0291349 | A1 | 11/2012 | Teng |
| 2014/0110329 | A1* | 4/2014 | Kemper ............... B01D 33/067 210/327 |
| 2014/0130413 | A1 | 5/2014 | Storey |
| 2014/0130414 | A1 | 5/2014 | Storey |
| 2014/0137472 | A1 | 5/2014 | Anderson |
| 2014/0144079 | A1 | 5/2014 | Lin |
| 2016/0029581 | A1 | 2/2016 | Martin |
| 2016/0066525 | A1 | 3/2016 | Duquesnay |
| 2017/0202162 | A1 | 7/2017 | Dufresne |
| 2017/0202164 | A1 | 7/2017 | Dufresne |
| 2018/0000029 | A1 | 1/2018 | Martin |
| 2018/0214790 | A1 | 8/2018 | Tucker |
| 2018/0228104 | A1 | 8/2018 | Mirzeabasov |
| 2018/0369714 | A1 | 12/2018 | Coffin |
| 2018/0369716 | A1 | 12/2018 | Robbins |
| 2019/0153484 | A1 | 5/2019 | Bray |
| 2019/0183848 | A1 | 6/2019 | Sorbo |
| 2019/0209633 | A1 | 7/2019 | Speier |
| 2019/0255534 | A1* | 8/2019 | Shelton, Jr ......... B01F 7/00508 |

FOREIGN PATENT DOCUMENTS

| | | | |
|---|---|---|---|
| WO | 9500007 | 1/1995 | |
| WO | WO-0232593 A1 * | 4/2002 | ............... B08B 3/12 |

* cited by examiner

EXTRACTION SYSTEM INCLUDING A MULTI-PORT EXTRACTION VESSEL AND EXTRACTION BASKET

CROSS REFERENCE TO RELATED APPLICATION

This application claims priority to commonly assigned, U.S. Provisional Patent Application Ser. No. 62/523,379, filed Jun. 22, 2017. Application Ser. No. 62/523,379 is fully incorporated herein by reference.

BACKGROUND

Extraction systems can be used to extract components from sample material. For example, in the production of botanicals, extraction systems can be used to extract botanicals from plant material. Often these extraction systems utilize a supercritical fluid extraction processes, although alternative extraction techniques have been developed which utilize a liquid solvent, such as liquid carbon dioxide ($CO_2$), which is a less aggressive means of extraction that provides benefits, such as the selective extraction of particular components (e.g., terpenes).

Many of the existing extraction systems in use today utilize a static extraction vessel with a single point of entry and/or a single exit point for liquid solvent to flow into and out of the extraction vessel. For example, extraction vessels in the form of vertical tubes can be stuffed with sample material, and liquid solvent can be introduced to the sample material in the vessel for extracting components therefrom. These types of extraction vessels suffer from several drawbacks in regards to their extraction efficacy and efficiency. For example, something called "channeling" occurs in many of today's extraction vessels. Channeling is where liquid solvent that enters the extraction vessel follows the path of least resistance and creates channels in the sample material where the solvent is in contact with only a small portion of the sample material. This uneven distribution of solvent creates "dead zones" in the sample material where the liquid solvent does not come into contact with the sample material. In some cases, these dead zones can make up a substantial portion of the sample material within the extraction vessel, which results in a suboptimal extraction system.

Provided herein are technical solutions to improve and enhance these and other systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, systems and techniques for extraction of one or more components from a sample material. According to some embodiments, a system for extracting components from sample material includes, among other things, a multi-port extraction vessel and an extraction basket that is configured to hold the sample material and to be rotated within the multi-port extraction vessel. Accordingly, the extraction vessel may include multiple ingress ports and multiple egress ports to allow a liquid solvent to flow through the extraction vessel during an extraction process that extracts one or more components from a sample material. The extraction basket may be disposed within the extraction vessel and rotatable within the extraction vessel. The extraction basket is permeable to allow liquid solvent to flow through the extraction basket and distribute throughout the sample material held within the extraction basket. A rotation mechanism, such as a motor, may rotate the extraction basket within the extraction vessel during the extraction process.

The multiple ingress ports and the multiple egress ports of the extraction vessel promote uniform distribution of the liquid solvent throughout the sample material within the extraction vessel, thereby minimizing, if not eliminating, any dead zones where the liquid solvent does not contact the sample material. For instance, the multiple ingress ports and the multiple egress ports may be distributed along a length of the extraction vessel to help spread the liquid solvent throughout the volume of the extraction vessel, which allows for a more consistent distribution of solvent throughout the sample material, and in the case where the extracted components are collected for production purposes, this can result in a higher yield of the extracted product, as compared to existing extraction systems. The multi-port extraction vessel also requires less suction pressure than a single port extraction vessel in configurations where the solvent is forced through the extraction vessel at a desired flow rate.

The rotatable extraction basket allows for a constant repositioning of the sample material during the extraction process. This agitating aspect of the extraction basket may promote the release of components from the sample material in a shorter amount of time, leading to extraction efficiencies. The rotatable extraction basket may also allow the extraction process to use less liquid, and may provide a more uniform extraction of any sample material that is otherwise prone to compacting, ensuring a consistent solid material out of the system.

It is to be appreciated that the extraction system described herein can be used for a variety of extraction applications. Although many of the examples herein are described in the context of extracting botanicals from plant material, it is to be appreciated that other extraction applications may benefit from the techniques and systems disclosed herein, such as for cleaning textiles or other raw materials (e.g., down feathers) used in the manufacture of textiles. In this sense, "extraction," as the term is used herein, is not limited to extraction for purposes of using the extracted components for production purposes (as is the case with botanical extraction), and it may cover extraction for cleaning purposes and other similar applications where the extracted substance may be discarded as waste material or recycled, in some cases.

According to some embodiments, a method of extracting one or more components from a sample material includes placing the sample material within an extraction basket that is disposed within an extraction vessel, flowing a liquid solvent through the extraction vessel via multiple ingress ports and multiple egress ports of the extraction vessel, rotating the extraction basket while the liquid solvent flows through the extraction vessel, and extracting, from the sample material, the one or more components.

These and other features will become apparent by reference to the figures and the following description.

Figure 1:
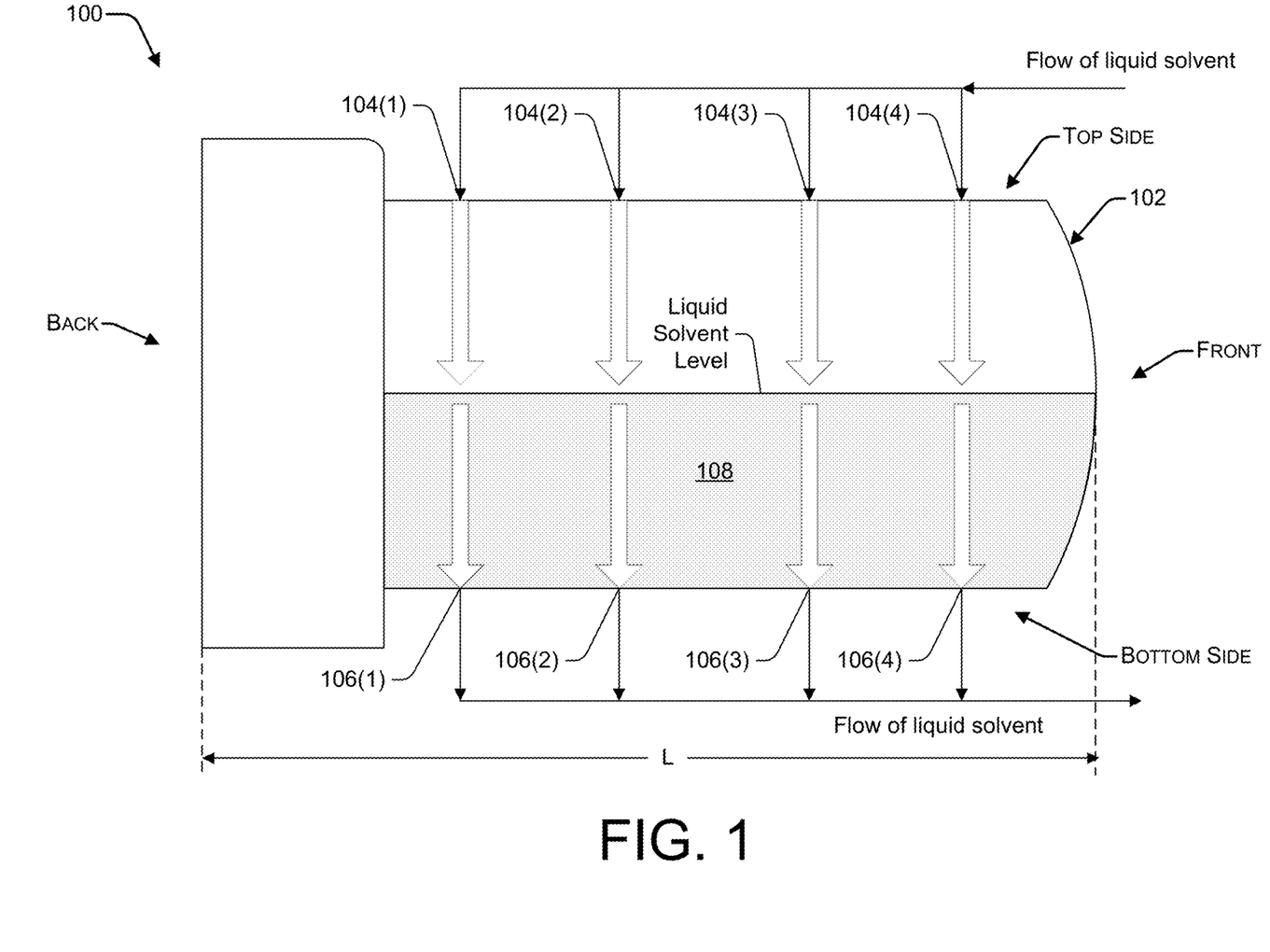
FIG. 1 illustrates an example multi-port extraction vessel that is part of the extraction system described herein.
Figure 2:
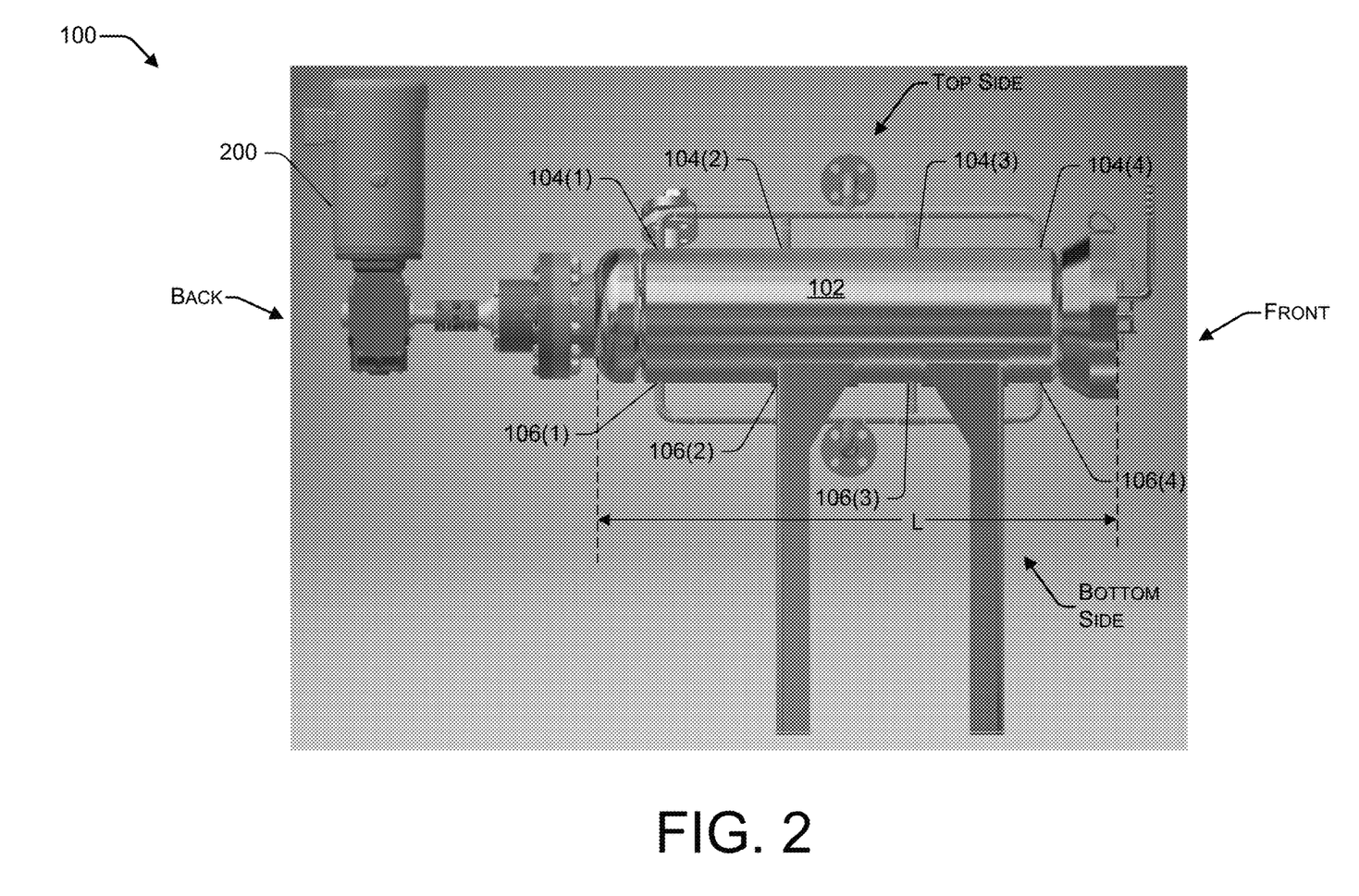
FIG. 2 illustrates an embodiment of the example multi-port extraction vessel.

FIG. 1 illustrates an example extraction system 100 that includes a multi-port extraction vessel 102 (referred to herein as "extraction vessel 102"). The extraction vessel may have any suitable shape or geometry. FIG. 1 shows an example extraction vessel 102 that can have a generally cylindrical shape (e.g., a horizontally oriented cylinder), which is conducive to a rotating extraction basket within the extraction vessel 102. The extraction vessel 102 is shown as having a front end, a back end, a top side, a bottom side, and a length, L. The length, L, of the extraction vessel 102 may be greater than the height of the extraction vessel 102, the height measured from the bottom side to the top side of the extraction vessel 102. The extraction vessel 102 may include multiple ingress ports 104(1), 104(2), 104(3), and 104(4) (collectively 104), and multiple egress ports 106(1), 106(2), 106(3), and 106(4) (collectively 106) to allow a liquid solvent 108 to flow through the extraction vessel 102 during an extraction process that extracts one or more components from a sample material. FIG. 1 shows that multiple ingress ports 104 may be disposed on the top side of the extraction vessel 102 and distributed along the length, L, of the extraction vessel 102, the multiple ingress ports 104 configured to receive the liquid solvent 108 entering the extraction vessel 102 during the extraction process. The multiple egress ports 106 may be disposed on the bottom side of the extraction vessel 102 and distributed along the length, L, of the extraction vessel 102, the multiple egress ports 106 configured to allow the liquid solvent 108 to exit the extraction vessel 102 during the extraction process. Any number of ingress ports 104 and any number of egress ports 106 may be utilized, although a greater number of ports may promote more uniform distribution of the liquid solvent 108 within the extraction vessel 102. FIG. 1 shows four ingress ports 104 and four egress ports 106 evenly distributed along the length, L, of the extraction vessel 102 such that the ports 104 are equidistantly spaced and the ports 106 are equidistantly spaced. FIG. 2 illustrates an embodiment of the example multi-port extraction vessel 102 with similar features shown in FIG. 2, which were described in FIG. 1. FIG. 2 additionally shows a rotation mechanism 200, such as a motor, which is configured to rotate the extraction basket within the extraction vessel 102. In some examples, the extraction vessel 102 is capable of holding a high pressure, such as about 3000 pounds per square inch (psi) and may be made of stainless steel or another suitable material.

An extraction basket (not shown in FIG. 1 or 2) may be disposed within the extraction vessel 102 to hold the sample material within the extraction basket and to rotate within the extraction vessel 102 during the extraction process. In general, the extraction basket disposed within the extraction vessel 102 is permeable to allow the liquid solvent 108 to flow through the extraction basket to extract one or more components from the sample material held in the extraction basket. The extraction basket can be loaded into the front end of the extraction vessel 102. The extraction basket is described in more detail with respect to the following figures.

In use, a sample material is introduced to the extraction vessel 102 by placing the sample material within the extraction basket (described in more detail below), and by inserting the extraction basket into the extraction vessel 102, in no particular order. The amount and type of sample material may vary depending on the desired application. For example, in applications where the extracted component(s) is to be collected and used in a production process for an end product, the sample material might be a plant material, and the component(s) to be extracted from the plant material might be desired botanicals, which may include, without limitation, volatiles, non-volatiles, fats, lipids, waxes, water, and pigments. As another example, in applications where the extracted component(s) may be discarded as waste, or otherwise recycled, but not necessarily used in a finished product, the sample material might be a textile (e.g., a down jacket), or a raw material that is used in the production of textiles (e.g., down feathers), and the sample material is desired to be cleaned by extracting one or more components from the sample material, such as oils or other components that may be undesirable in a finished textile product. Thus, the extracted components may include various substances including, without limitation, botanicals, natural fibers, plant oil, animal oil, cannabinoids, terpenes, or any other component that might be extracted using a liquid solvent 108, such as $CO_2$.

The extraction vessel 102 may initially be filled with a gas, such as air, and the gas can be purged by introducing the desired solvent. The solvent may be introduced in liquid form, or possibly in a gaseous form where the solvent undergoes a phase change within the extraction vessel 102 from gas to liquid. According to some examples, liquid carbon dioxide ("$CO_2$") is used as the solvent. Using $CO_2$ as an example solvent, liquid $CO_2$ may be stored in the storage tank, and introduced into the extraction vessel 102 in its liquid form via the multiple ingress ports 104. The liquid solvent, $CO_2$ in some cases, may be forced through the extraction vessel 102 (e.g., using pumps, the force of gravity, etc.), and the solvent containing the extracted component(s) (e.g., botanicals, oils, etc.) may exit from the multiple egress ports 106 where it may be directed to a collection chamber(s). In the collection chamber, heat may be applied and the liquid solvent may be boiled off into a gas. The gas may be condensed back into a liquid (e.g., using a heat exchanger) and returned to a storage tank where it can flow again into the extraction vessel 102 via the multiple ingress ports 104. In this way, the liquid solvent 108 can be recycled and circulate through the extraction vessel 102. If the extracted component is to be used for production purposes, the extracted component remaining in the collection chamber may be withdrawn, such as through a spigot, or some other selective withdrawal mechanism. Otherwise, the extracted component may be discarded as waste, or otherwise recycled if not used in the production of an end product.

$CO_2$ is a suitable liquid solvent 108 because it is relatively cheap, widely available, chemically inert, non-toxic, non-flammable and readily available at high purity. Moreover, $CO_2$ exhibits supercritical behavior at relatively mild conditions and can safely be vented to the atmosphere, and does not leave organic residues, thus making it a suitable solvent according to some embodiments described herein. For explanatory purposes of some of the embodiments disclosed here, $CO_2$ will be used as the solvent, without limiting its usage in all cases.

Figure 3:
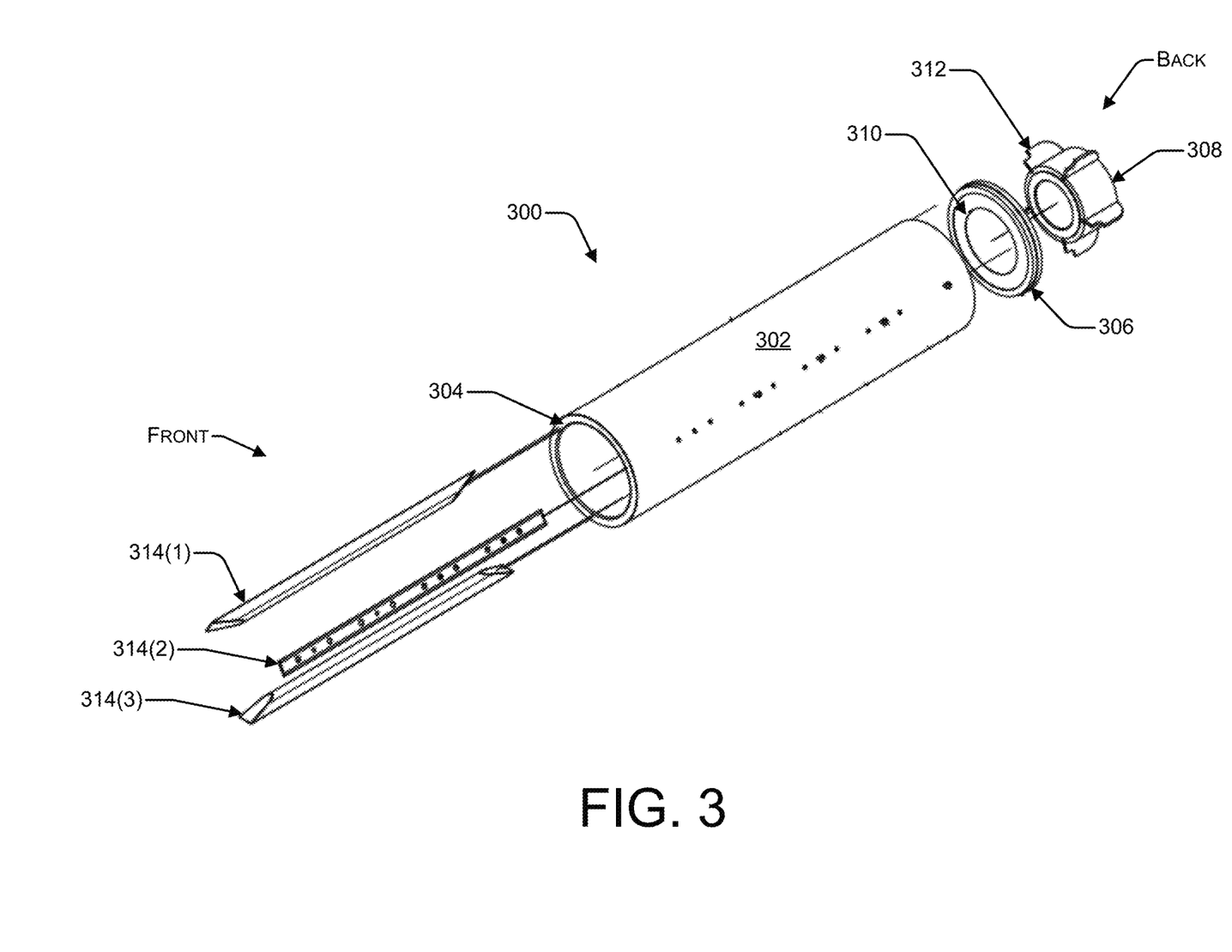
FIG. 3 illustrates an exploded perspective view of an example extraction basket that is part of the extraction system described herein.

FIG. 3 illustrates an exploded perspective view of an example extraction basket 300 that is part of the extraction system 100 described herein. The extraction basket 300 may be disposed within (and removable from) the extraction vessel 102. As such, the extraction basket 300 may have a complementary shape or geometry to that of the extraction vessel 102, such as a cylindrical shape, as shown in FIG. 3. Accordingly, the extraction basket 300 may be implemented as a generally cylindrical tube that is configured to hold (e.g., contain) a sample material during an extraction process. The extraction basket 300 is permeable to allow the liquid solvent 108 to penetrate and pass through the extraction basket 300 during the extraction process. For example, the extraction basket 300 may include a body portion 302 that is made of a mesh material (e.g., a metal mesh) to allow the liquid solvent 108 to pass through the mesh material and distribute throughout the sample material held within the extraction basket 300.

A front ring 304 and a back ring 306 may be disposed on a front annular end and a back annular end, respectively, of the body portion 302 of the extraction basket 300. These rings 304 and 306 may allow for interfacing with additional component parts of the extraction basket 300, such as a door on a front end of the extraction basket 300 and a shaft hub 308 on a back end of the extraction basket 300. A back panel 310 may be disposed between the body portion 302 and the back ring 306. The shaft hub 308 may allow for coupling to a rotation mechanism, such a motor, which applies a torque to the shaft hub 308 to rotate the extraction basket 300 about an axis that runs along the length of the extraction basket 300 when the basket 300 is disposed within the extraction vessel 102 during an extraction process. The extraction basket 300 can be loaded into the extraction vessel 102 by inserting the back end of the basket 300 into the front end of the extraction vessel 102, through an opening in the extraction vessel 102, such as a door. Thus, the basket 300 and the extraction vessel 102 can be oriented in the same orientation such that each of their front ends are on the same side of the system 100, and each of their back ends are on the same side of the system 100.

The shaft hub 308 may include multiple radially distributed fins 312 that protrude from an outer surface of the shaft hub 308. These fins 312 may promote movement of the liquid solvent 108 and may create turbulence in portions of the sample material that are submerged in liquid solvent 108. This, in turn, may promote extraction of a desired component(s) from the sample material within the extraction basket 300. In some embodiments, a fan can be disposed at the back end of the extraction basket 300 to further promote movement of the liquid solvent 108 during the extraction process.

Multiple paddles 314(1), 314(2), and 314(3) (collectively 314) may be radially distributed about, and may protrude from, an inner surface of the body portion 302. FIG. 3 shows three example paddles that can be equally spaced from each other within the body portion 302, although any number of paddles 314 can be utilized. The paddles 314 may help to reposition the sample material during rotation of the extraction basket 300 by preventing the extraction basket 300 from simply rotating around the sample material so that the sample material does not stay stationary during rotation. The paddles 304 may be interchangeable with other types (e.g., different width, length, height, etc.) of paddles 314 to optimize the mechanical action of the basket 300 and material retention. Each paddle 314 may span at least 60% of the length of the extraction basket 300. In some embodiments, each paddle 314 may span at least 75% of the length of the extraction basket 300.

Figure 4:
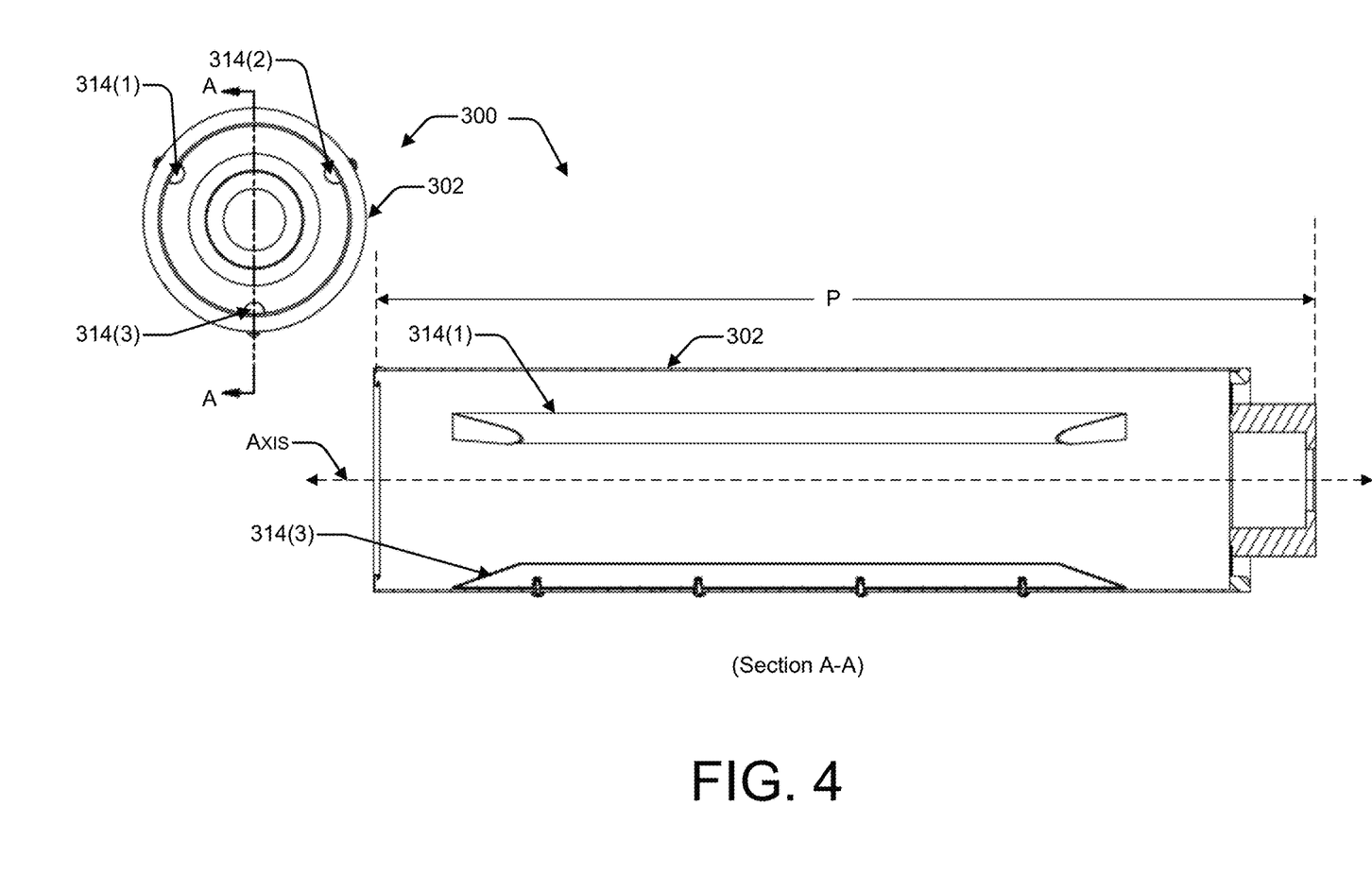
FIG. 4 illustrates a front view and a side cross-sectional view (taken along Section A-A) of the example extraction basket.

FIG. 4 illustrates a front view and a side cross-sectional view (taken along Section A-A) of the example extraction basket 300. FIG. 4 illustrates the extraction basket 300 having a length, P, and that the paddles 314 mounted within the body portion 302 of the extraction basket 300 may span a majority of the length, P, of the extraction basket 300, such as at least 60% of the length, P, of the extraction basket 300. FIG. 4 also provides another vantage point showing how the paddles 314 are radially distributed about an inner surface of the body portion 302, and how the paddles 314 protrude from the inner surface of the body portion 302 to promote movement of the sample material within the extraction basket 300 during rotation of the basket 300. FIG. 4 also shows an axis that runs along the length, P, of the extraction basket 300, such as down the center of a cylindrically shaped basket 300.

Figure 5:
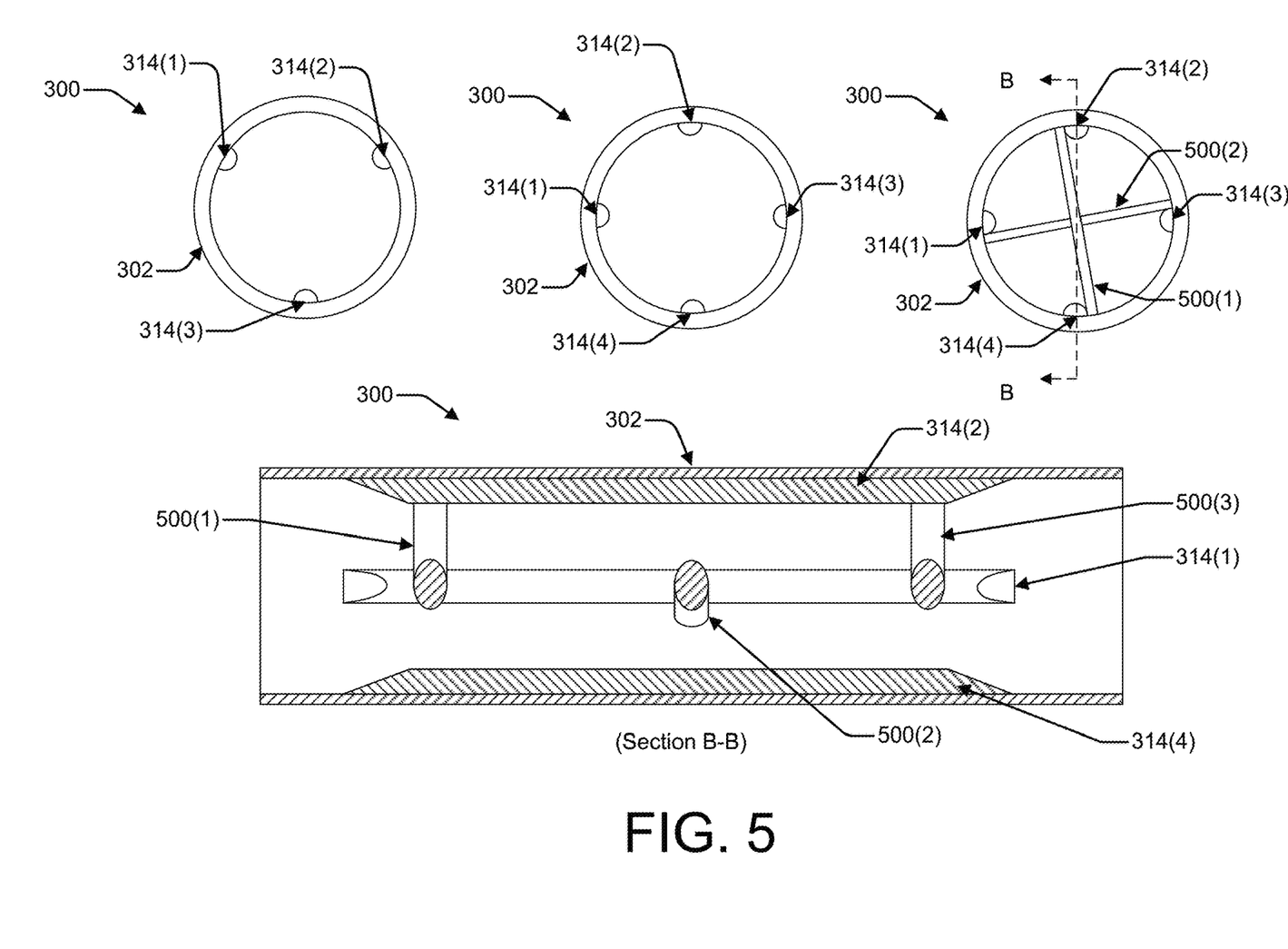
FIG. 5 illustrates front views of varying configurations of internal components of the extraction basket, as well as a side cross-sectional view (taken along Section B-B) of the example extraction basket having paddles and crossbars distributed along the length of the extraction basket.

FIG. 5 illustrates front views of varying configurations of internal components of the extraction basket 300, as well as a side cross-sectional view (taken along Section B-B) of the example extraction basket 300 having paddles 314 and crossbars 500 distributed along the length, P, of the extraction basket 300. As shown in the front views, a configuration of the extraction basket 300 can have three paddles 314(1)-(3) radially distributed about, and protruding from, an inner surface of the body portion 302, four paddles 314(1)-(4) radially distributed about, and protruding from, the inner surface of the body portion 302, or any other suitable number of paddles 314. The radial distribution of the paddles 314 may be substantially even such that the paddles 314 are spaced equally from one another.

The configuration shown on the far right front view, and in the cross-sectional view, of FIG. 5 illustrates a configuration where the extraction basket 300 includes multiple crossbars 500(1), 500(2), and 500(3) (collectively 500) that are mounted within the body portion 302 of the extraction basket 300 orthogonal to the axis that runs along the length, P, of the extraction basket 300. FIG. 4 depicts this axis that runs along the length, P, of the basket 300. The multiple crossbars 500 may be distributed along the length, P, of the extraction basket 300, and each crossbar 500 of the multiple crossbars 500 can be rotationally offset with respect to an adjacent crossbar 500 of the multiple crossbars 500. For example, the first crossbar 500(1) may be oriented vertically, the second crossbar 500(2) that is adjacent to the first crossbar 500(1) may be oriented horizontally (i.e., rotationally offset by roughly 90 degrees, give or take a couple of degrees margin of error). As shown in FIG. 5, an individual crossbar 500 may be mounted to the inner surface of the body portion 302 on one side of a first paddle 314(2) at one end of the crossbar 500, and may be mounted to the inner surface of the body portion 302 on an opposite side of a second paddle 314(4) at the opposite end of the crossbar 500. Each crossbar 500 may have a width or thickness of about 4 to 6 inches (e.g., a 4-6 inch diameter rod or bar), and adjacent crossbars 500 may be spaced about 1 foot apart. Given the dimensions of the extraction system 100 in contemplated applications, three crossbars 500 is a suitable number of crossbars 500 to distribute along the length, P, of the extraction basket 300. The crossbars 500 helps to break up a center core of a sample material (e.g., plant material, down feathers, etc.) that tends to stay within a mass of sample material, and, as a result, the sample material is mixed and moved better within the extraction basket 300 as the basket 300 rotates.

Figure 6:
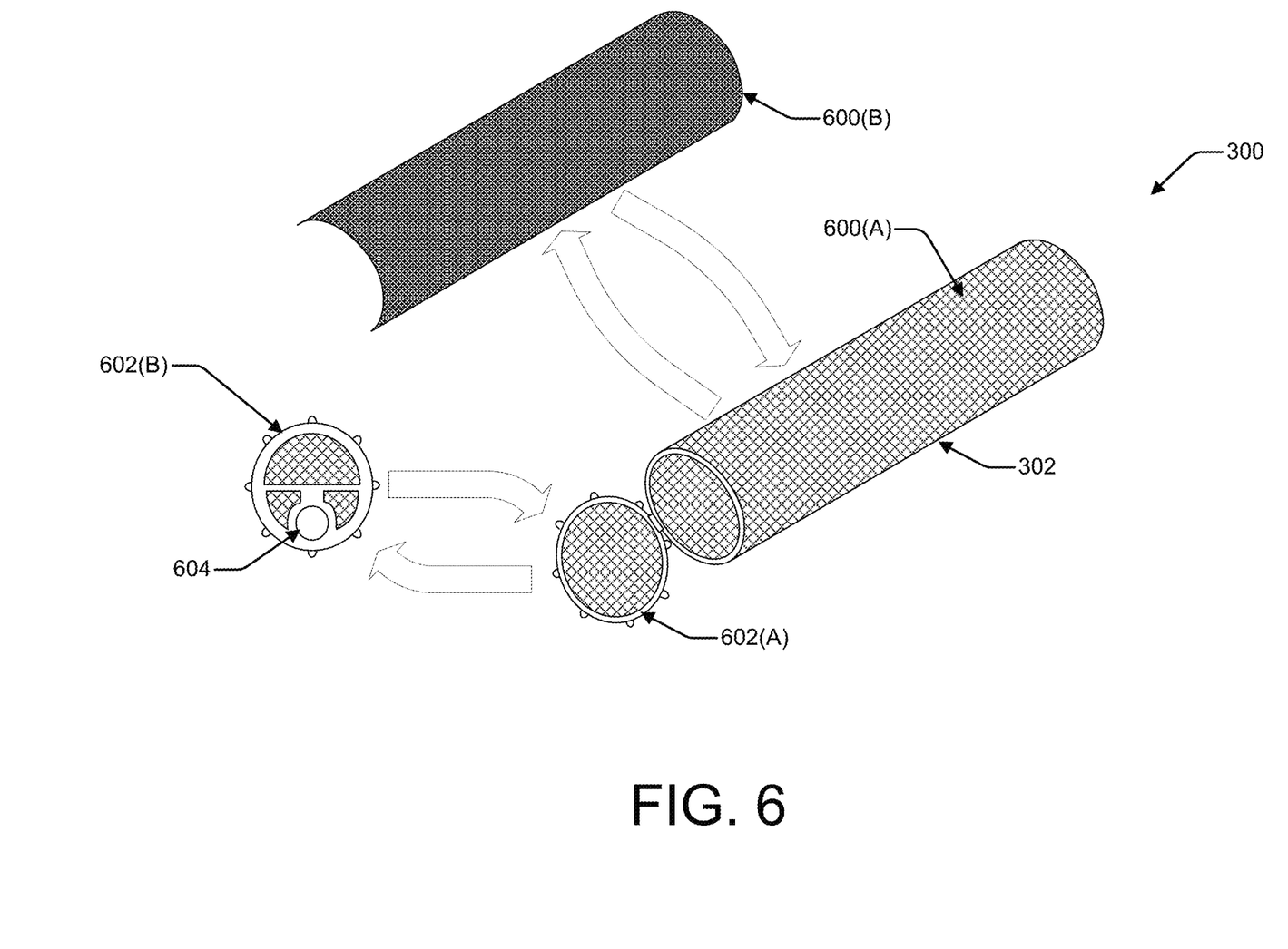
FIG. 6 illustrates an example configuration of the extraction basket having interchangeable parts, such as body panels and/or doors, for enabling different extraction applications.

FIG. 6 illustrates an example configuration of the extraction basket 300 having interchangeable parts, such as body panels and/or doors, for enabling different extraction applications. For example, the body portion 302 of the extraction basket 300 may comprise one or more removable panels 600(A) of mesh material having openings of a first size, which may be interchangeable with one or more replacement panels 600(B) made of the mesh material, or different mesh material, having openings of a second size different than the first size. Accordingly, if a sample material that includes relatively small particles is to be placed in the basket 300 for extraction, a second panel 600(B) with a smaller mesh size than the existing panel 600(A) may be used for that small-particle sample material (e.g., down feathers). By contrast, if the sample material is a textile (e.g., a down jacket), the coarser/larger mesh size of the existing panel 600(A) may be sufficient. Thus, the panels 600(A) and 600(B) can be interchanged to allow for varying applications using different sample materials with the same basket 300.

FIG. 6 also shows wherein the extraction basket 300 as having a door 602(A) that is openable to place sample material within the basket 300, and closable to contain the sample material within the basket 300 during the extraction process. For example, a hinge may allow for opening the door 602(A) to access the contents within the basket 300. The door 602(A) may also be made of the same mesh material, or a different mesh material, as the mesh material of the body portion 302 (e.g., of either or both of the panels 600(A) or 600(B)). This is to promote flow of the liquid solvent 108 throughout the basket 300, providing more points of ingress/egress to/from the basket 300, as compared to a basket with impermeable ends. The door 602(A) may also be interchangeable with one or more replacement doors 602(B). For example, the hinge may be detachable for along removal and replacement of any suitable door 602. A replacement door 602(B) may include a loading port 604 that is configured to enable loading of a particular sample material into the extraction basket 300. For example, the door 602(A) may be used for loading textiles, such as down jackets, into the basket 300, while the replacement door 602(B) may be used when loading a different sample material, such as down feathers into the basket 300. For example, a blower can be attached to the loading port 604, and the blower can load down feathers into the extraction basket 300 via the loading port 604. Each door 602 may include latches distributed around a periphery of the door 602, which are configured to attach to latch points on the front end of the extraction basket 300.

Figure 7:
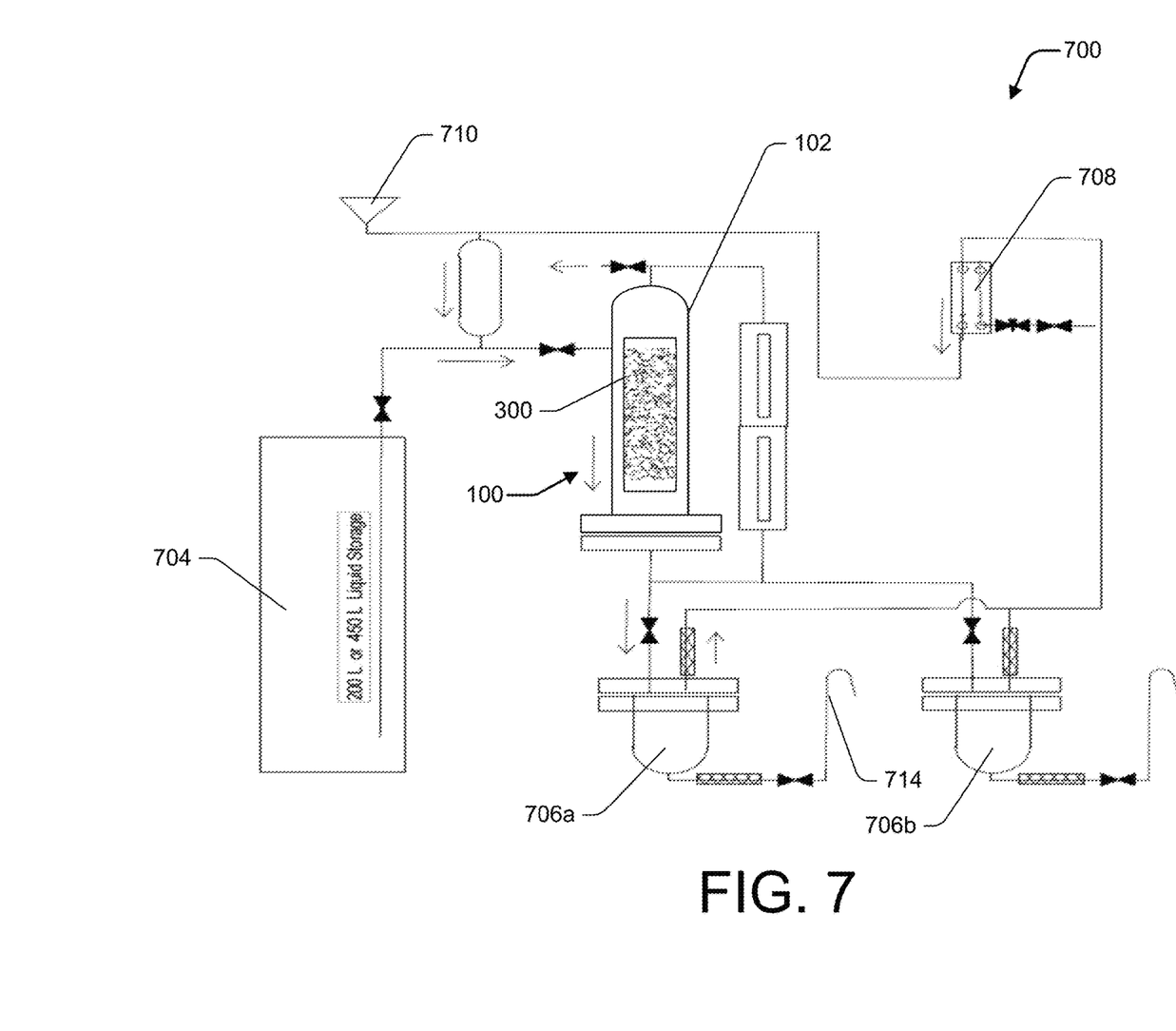
FIG. 7 is a block diagram illustrating an example larger system where the disclosed extraction system (e.g., the extraction vessel and extraction basket) can be implemented.

FIG. 7 is a block diagram illustrating an example larger system 700 where the disclosed extraction system 100 (e.g., the extraction vessel 102 and extraction basket 300) can be implemented. FIG. 7 also indicates a general process flow for extraction of components from a sample material. The illustrated system includes the extraction system 100 (e.g., the extraction vessel 102, the extraction basket 300, etc.), a solvent storage tank 704, one or more collection chambers 706a, 706b, a heat exchanger 708, and in some embodiments, an additive port 710. These components may be in fluid communication with one another through the use of tubing, valves, and other devices to allow the process to proceed as described herein.

The arrows shown throughout the drawing generally describe the direction of fluid and gas flow. The illustrated process begins after the sample material has been loaded into the extraction basket 300 and the extraction vessel 102 receives the extraction basket 300 therein. One or more processes can be performed on the sample material to extract the desired components (e.g., botanicals, which may include, without limitation, volatiles, non-volatiles, fats, lipids, waxes, water, and pigments, natural fibers, plant oils, animal oils, cannabinoids, terpenes, etc.).

Using $CO_2$ as an example solvent 108, liquid $CO_2$ may be stored in the storage tank 704, and introduced into the extraction vessel 102 via the multiple ingress ports 104 in its liquid form. The sample material within the extraction vessel 102 may respond in different ways to various temperatures and pressures. As a consequence, the sample material can be exposed to sequentially increasing temperatures and pressures to extract various components from the sample material.

Heat may be added to the extraction vessel 102, such as by a heater, heat transfer of a liquid medium, frictional agitation, or through some other heat transfer process. As heat is applied, the pressure within the extraction vessel 102 rises. Once the heat within the extraction vessel 102 is within a first desired range, heat is no longer applied and the temperature and pressure within the extraction vessel 102 stay within a desired range.

The liquid solvent 108, $CO_2$ in some cases, is forced through the sample material while the extraction basket 300 rotates. The liquid solvent 108 exits from the multiple egress ports 106 of the extraction vessel 102, and then continues to a collection chamber 706a along with extracted components picked up from the sample material. In the collection chamber 706a, heat may be applied and the liquid solvent 108 may be boiled off into a gas which proceeds to a heat exchanger 708. The gas is condensed back into a liquid at the heat exchanger 708 and returned to the storage tank 704. The extracted component(s) left in the collection chamber 706a may be under pressure within the closed system and may be withdrawn, such as through a spigot 714, or some other selective withdrawal mechanism.

One or more collection chambers 706a, 706b, . . . , 706n may be provided in order to separately collect the various fractionated components (e.g., botanicals) that may be extracted from the sample material without causing cross contamination between the different components in the separate collection chambers 706a, 706b.

The illustrated system is a closed system and the solvent 108 may change phase from a liquid, to a gas, and is condensed back into a liquid and returned to take part in additional processing cycles. Any remaining gas in the system may be vented and purged from the system. As described, the process may be repeated at different temperatures, pressures, flow rates, etc., to extract various components in sequence.

During some cycles, it may be desirable to add one or more modifiers to the system, such as by introducing a modifier by way of an additive port 710. The modifier may be added to the liquid solvent 108 as it is introduced into the extraction vessel 102. In some cases, the modifier is selected to result in a more robust extraction in a shorter period of time than without the modifier. In some cases, the modifier may be an alcohol.

As shown in FIG. 1, a closed system is provided that operates at a steady pressure and temperature, until the solvent is condensed. The relatively steady pressure preserves the volatile compounds that are typically destroyed with the extraction processes that operate in the solvent supercritical phase. Moreover, the illustrated system uses direct refrigeration, which may be provided by the solvent itself, without the need for external chillers or pumps. The illustrated system is thermodynamically driven, meaning that through the application of heat, the pressure within the system is brought to a desired pressure, which causes the solvent and botanical to flow through the system. The system 700 in FIG. 1 is but one example system that may implement the disclosed extraction system 100. For example, other larger systems incorporating the extraction system 100 disclosed herein may operate using pumps to encourage fluid circulation through the system, chillers to vary the temperature of the solvent 108. In addition, it is to be appreciated that any system incorporating the disclosed extraction system 100 may be fully or partially automated, such as by controlling parameters and components through a computerized controller to run through the extraction cycles, as desired.

Figure 8:
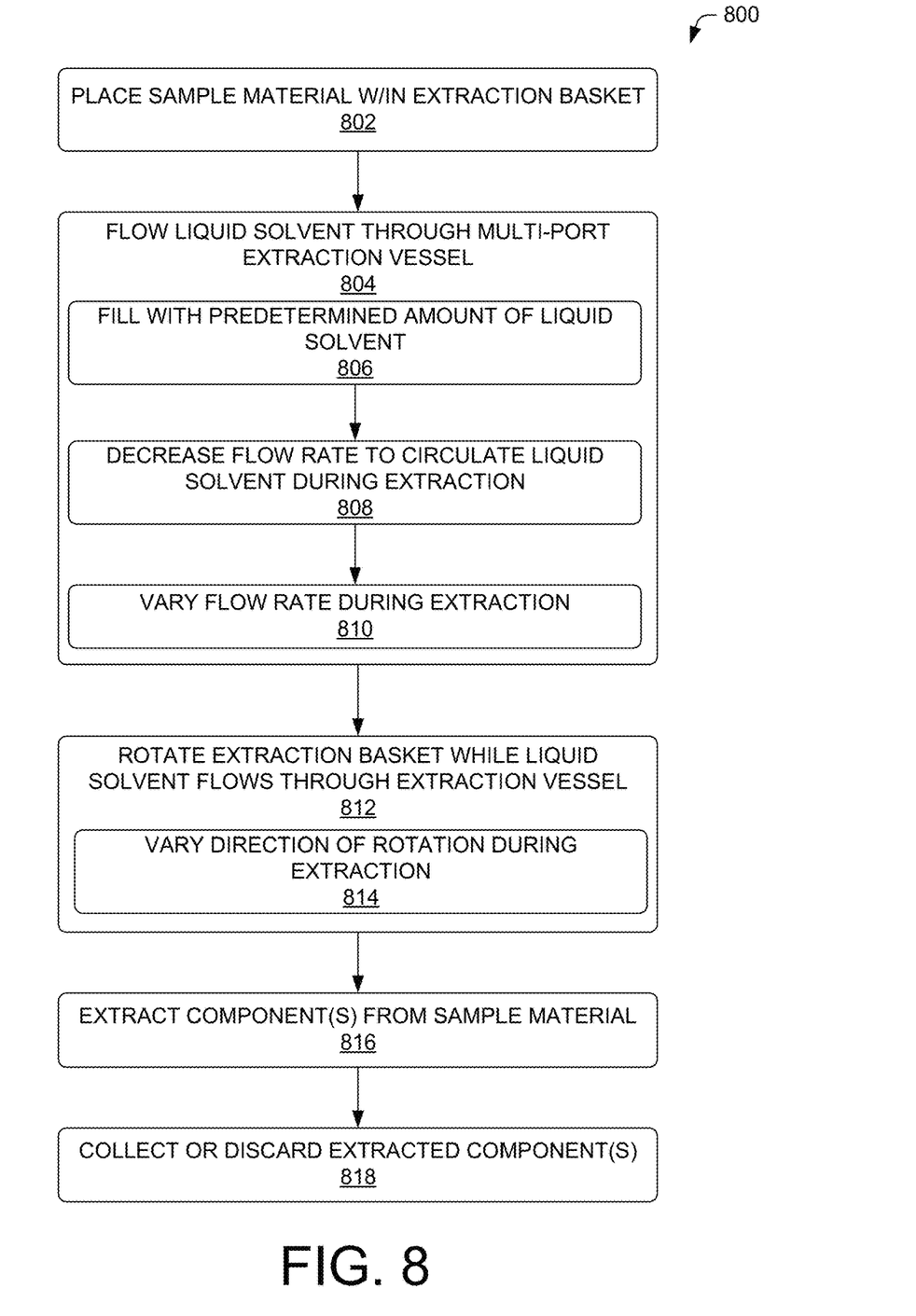
FIG. 8 is a process flow for extracting one or more components from a sample material using an extraction system that includes a multi-port extraction vessel and an extraction basket.

FIG. 8 is a process flow for extracting one or more components from a sample material using an extraction system that includes a multi-port extraction vessel and an extraction basket.

At block 802 of the example process 800, a sample material (e.g., plant material, textiles, raw material used in textiles, etc.) may be placed within an extraction basket 300 that is disposed within an extraction vessel 102. It is to be appreciated that the sample material may be loaded into the extraction basket 300, and then the extraction basket 300 may be inserted into the extraction vessel 102, or the extraction basket 300 may already be disposed within the extraction vessel 102 at the time of loading the sample material into the extraction basket 300 at block 802.

At block 804, a liquid solvent 108 (e.g., liquid $CO_2$) may be flowed through the extraction vessel via multiple ingress ports 104 and multiple egress ports 106 of the extraction vessel 102. As shown by sub-block 806, this may involve flowing the liquid solvent 108 at a first flow rate to fill the extraction vessel 102 with a predetermined amount of the liquid solvent 108 (or to a predetermined portion of the volume of the extraction vessel 102). In some embodiments, the flow rate at block 806 may be selected to fill the extraction vessel 102 about half full of the liquid solvent 108. At sub-block 808, in response to the extraction vessel 102 being filled with the predetermined amount of the liquid solvent 108, the first flow rate may be adjusted down (i.e., decreased) to a second flow rate that is less than the first flow rate, and the solvent 108 may be circulated through the extraction vessel 102 continuously. At sub-block 810, the flow rate at which the liquid solvent 108 flows through the extraction vessel 102 may be dynamically changed during the extraction process.

At block 812, the extraction basket 300 may be rotated (e.g., via a rotation mechanism, such as a motor 200) while the liquid solvent 108 flows through the extraction vessel 102. As shown by sub-block 814, the rotational direction of the extraction basket 300 may be varied during the extraction process. For example, the extraction basket 300 may be rotated initially in a first direction, and then the extraction basket 300 may be rotated in a second direction opposite the first direction after having rotated the extraction basket 300 in the first direction for a period of time. Varying the direction of rotation in this manner (e.g., periodically at set intervals, at random, etc.) allows the sample material to be shifted and components to be extracted easier. It also allows for using less liquid solvent 108, as compared to rotating in a single direction. Varying the direction of rotation at sub-block 814 during the extraction process may also provide more uniform extraction of compacted sample material, ensuring a consistent solid material out of the system 100.

At block 816, one or more components may be extracted from the sample material as the liquid solvent 108 flows through the multi-port extraction vessel 102 while the extraction basket 300 rotates. The liquid solvent 108 may circulate through the extraction system 100 continuously at block 804, and the flow rate of the solvent 108 can be varied dynamically at sub-block 810, as the basket 300 rotates and as the component(s) is extracted at blocks 812 and 816, respectively.

At block 818, the extracted component(s) may be collected or discarded. For example, depending on the application, the extracted component(s) may be regarded as a valuable end product of the extraction process that is to be used in a downstream production process (as is the case with botanicals extracted from plant material, for example), or the extracted component(s) may be regarded as waste material that is a byproduct of an application such as textile cleaning, where the sample material after extraction is complete is the value item that is desired to be kept and used in a downstream process or endeavor.

The process 800 of extracting one or more components may be performed for any suitable length of time and/or repeated a number of times to extract a desirable amount of the components from the sample material. The process parameters may be altered for one or more of the extraction processes. For example, the process may initially start at a relatively low temperature and pressure, and the temperature and pressure may be gradually increased through subsequent processes. In some cases, a modifier may be added to the solvent to influence the extraction efficacy, the solvent, or the resulting product.

Although the subject matter has been described in language specific to structural features and/or methodological acts, it is to be understood that the subject matter defined in the appended claims is not necessarily limited to the specific features or structure described. Rather, the specific features and structure are disclosed as exemplary forms of implementing the claims.

We claim:

1. A system for extracting one or more components from a sample material, the system comprising:
    an extraction vessel having a length and comprising:
        multiple ingress ports disposed on a top side of the extraction vessel and distributed along the length of the extraction vessel, the multiple ingress ports configured to receive a liquid solvent entering the extraction vessel during an extraction process, and
        multiple egress ports disposed on a bottom side of the extraction vessel and distributed along the length of the extraction vessel, the multiple egress ports configured to allow the liquid solvent to exit the extraction vessel during the extraction process;
    an extraction basket having a length and disposed within the extraction vessel, the extraction basket comprising a body portion that is made of a mesh material and configured to hold the sample material during the extraction process, and multiple paddles distributed about, and protruding from, an inner surface of the body portion, each paddle of the multiple paddles spanning at least 60% of the length of the extraction basket;

a rotation mechanism to rotate the extraction basket within the extraction vessel during the extraction process; and multiple fixed crossbars oriented orthogonal to an axis that runs along the length of the extraction basket, the multiple crossbars individually distributed along the length of the extraction basket, each crossbar of the multiple crossbars rotationally offset with respect to an adjacent crossbar of the multiple crossbars, and each individual crossbar of the multiple crossbars mounted on one side of a first paddle of the multiple paddles and mounted at an opposite end to an inner surface of the extraction basket on an opposite side of a second paddle of the multiple paddles such that the multiple crossbars extend across the entire diameter of the extraction basket and are fixed to the extraction basket and rotate with the extraction basket.

2. The system of claim 1, wherein the multiple ingress ports and the multiple egress ports are distributed evenly along the length of the extraction vessel.

3. The system of claim 1, wherein each crossbar is rotationally offset with respect to an adjacent crossbar by 90 degrees.

4. The system of claim 1, wherein the body portion of the extraction basket comprises one or more removable panels of the mesh material having openings of a first size, the one or more removable panels being interchangeable with one or more replacement panels made of the mesh material, or a different mesh material, having openings of a second size different than the first size.

5. The system of claim 1, wherein the extraction basket further comprises a door that is openable to place the sample material within the extraction basket, and closable to contain the sample material within the extraction basket during the extraction process, the door being made of the mesh material or a different mesh material.

6. The system of claim 5, wherein the door of the extraction basket is interchangeable with a replacement door that includes a loading port for loading a different sample material into the extraction basket.

7. The system of claim 1, wherein the extraction basket includes a shaft hub on a back end of the extraction basket, the shaft hub having multiple radially distributed fins that protrude from an outer surface of the shaft hub.

* * * * *